UNITED STATES PATENT OFFICE.

EDWARD GOODRICH ACHESON, OF NEW YORK, N. Y.

PAPER PRODUCT AND PROCESS OF MAKING THE SAME.

1,419,951. Specification of Letters Patent. Patented June 20, 1922.

No Drawing. Application filed July 15, 1920. Serial No. 396,461.

*To all whom it may concern:*

Be it known that I, EDWARD GOODRICH ACHESON, a citizen of the United States, residing at New York, in the county of New York and State of New York, have invented certain new and useful Improvements in Paper Products and Processes of Making Same, of which the following is a specification.

This invention relates to the preparation of a novel paper or paper-like product, containing clay or similar filling material in an initially-deflocculated state; and to the novel product of the operation.

It is now well understood that certain non-crystalline substances, including clay, amorphous pigments and the like, when rubbed, ground or otherwise subjected to a process of attrition in presence of so-called "deflocculating agents", are ultimately reduced to a state of extreme subdivision, as a result of which a greater or less proportion of the particles become permanently suspensible in water and capable of diffusing therethrough. The deflocculating agents above referred to comprise tannin and tannin-like bodies, and other organic bodies or products capable of producing similar effects. Certain methods of deflocculating solid bodies and utilizing the resulting deflocculated products are disclosed in my prior U. S. Patents Nos. 722,791; 843,426; 844,989; 875,881; 895,063; 911,358; 931,832; 964,478; 966,636; 986,793; 1,030,372; 1,082,386; 1,201,994; 1,223,350.

According to the present invention I utilize the properties of matter in the deflocculated state in such manner as to secure a highly intimate and perfect impregnation of paper, or similar fibrous products, with clay, kaolin or other filler of similar character. I prefer to proceed as follows, it being understood that my invention is not limited to the manipulative details below recited by way of example.

A suitable grade of fine white clay or kaolin is first subjected to attrition in presence of the deflocculating agent, the agent which I now prefer to employ being a reaction product (in aqueous solution) of ammonia or of hexamethylenetetramine with a roasted cereal or other starchy material, such for example as is described in my prior Patent 1,253,556 patented Jan. 15, 1918. By subjecting the clay to sufficiently prolonged attrition in presence of such agent a substantially complete deflocculation may be secured; that is to say the clay particles, or a very large proportion of them, will be found to undergo subdivision beyond the limits of visibility under even very high power magnification, and to become permanently suspensible in pure water, although susceptible of precipitation by the action of small proportions of electrolytes. It is not essential for the purposes of this invention that the whole of the clay should undergo deflocculation, nor is it essential that the deflocculated portion should be separated from the remainder; although I prefer that the product should contain a high and usually a predominating percentage of the material in the deflocculated state. In this state it possesses the property of penetrating paper freely, and of entering into an extremely close and intimate relation with the fibers of paper or of paper pulp.

The immediate product of the deflocculation is a water-containing paste comprising, as the principal solid component, the deflocculated clay together with any residue which may have escaped deflocculation; and also the deflocculating agent which has been absorbed and retained by the clay. This paste may now, in the preferred embodiment of the invention, be charged directly into the beater in any desired proportions according to the amount of filler to be incorporated with the fiber. The deflocculated material is thoroughly incorporated with the pulp by the beater action; and if desired the pulp may be laid directly into paper, the clay becoming permanently associated with the fibers during the subsequent calendering and drying operations.

I prefer however, following the step of incorporating the deflocculated clay with the fibers, to introduce into the charge a rosin or other size, together with an alum or other precipitant, which in this case serves also to precipitate or re-flocculate the deflocculated clay in the most intimate association with the sizing material. The paper is then laid and treated as usual, or if desired the alum or other precipitating electrolyte may be used without the sizing material, the latter being either subsequently applied to the paper sheet, or omitted altogether, as is well understood in this art.

The papers thus prepared with a filler consisting of initially-deflocculated clay, kaolin or equivalent material are characterized by an extreme smoothness and fineness of surface and texture, and lend themselves well to the usual finishing and coating operations.

I claim:—

1. In a process of making filled papers, the step consisting in incorporating with the pulp a filling material introduced in a deflocculated state.

2. In a process of making filled papers, the steps consisting in incorporating with the pulp an initially-deflocculated filling material and precipitating the same in presence of the fibers by the addition of an electrolyte.

3. In a process of making filled papers, the steps consisting in incorporating with the pulp an initially-deflocculated filling material and precipitating the same in conjunction with a sizing material and in presence of the fibers by the addition of an electrolyte.

4. A paper product containing a filling material introduced in a deflocculated state.

In testimony whereof, I affix my signature.

EDWARD GOODRICH ACHESON.